US012307495B2

(12) United States Patent
Girer

(10) Patent No.: US 12,307,495 B2
(45) Date of Patent: May 20, 2025

(54) SYSTEM FOR EXTRACTING AND COMPARING INFORMATION ACCESSIBLE BY QUERIES FROM MERCHANT COMPUTER SERVERS

(71) Applicant: JUZOLOO, Villeurbanne (FR)

(72) Inventor: Laurent Girer, Poleymieux (FR)

(73) Assignee: JUZOLOO, Villeurbanne (FR)

( * ) Notice: Subject to any disclaimer, the term of this patent is extended or adjusted under 35 U.S.C. 154(b) by 358 days.

(21) Appl. No.: 17/942,179

(22) Filed: Sep. 12, 2022

(65) Prior Publication Data
US 2023/0087661 A1    Mar. 23, 2023

(30) Foreign Application Priority Data
Sep. 20, 2021   (FR) ...................................... 2109884

(51) Int. Cl.
*G06F 15/16* (2006.01)
*G06Q 30/0601* (2023.01)
*H04L 67/02* (2022.01)

(52) U.S. Cl.
CPC ......... *G06Q 30/0629* (2013.01); *H04L 67/02* (2013.01)

(58) Field of Classification Search
CPC ............................ H04L 67/02; G06Q 30/0629
USPC ......................................................... 709/217
See application file for complete search history.

(56) References Cited

U.S. PATENT DOCUMENTS

| | | | | |
|---|---|---|---|---|
| 8,156,151 B2 * | 4/2012 | Sidman | .................... | G06F 21/10 707/803 |
| 8,214,299 B2 * | 7/2012 | Bishop | ................. | G06Q 20/341 726/28 |
| 8,612,543 B2 * | 12/2013 | Shuster | ................. | H04L 63/126 709/219 |
| 8,700,524 B2 * | 4/2014 | Williams | ............... | G06Q 20/16 705/318 |
| 9,519,894 B2 * | 12/2016 | Bishop | ................. | G06Q 20/401 |
| 9,848,052 B2 * | 12/2017 | Kumnick | ............. | G06Q 20/385 |
| 10,438,226 B2 * | 10/2019 | Kim | ........................ | H04L 47/70 |
| 10,650,380 B1 * | 5/2020 | Harris, Sr. | ........... | G06Q 20/401 |
| 10,798,757 B2 * | 10/2020 | Elad | ........................ | H04L 67/02 |
| 11,055,734 B2 * | 7/2021 | Kim | ...................... | G06Q 20/387 |
| 11,122,133 B2 * | 9/2021 | Kumnick | ............. | H04L 63/083 |
| 11,128,645 B2 * | 9/2021 | Valgushev | .......... | H04L 63/0435 |
| 11,475,091 B1 * | 10/2022 | Itänen | ..................... | H04L 67/02 |

(Continued)

*Primary Examiner* — Moustafa M Meky
(74) *Attorney, Agent, or Firm* — Helene Laville; HEFIP, LLC

(57) ABSTRACT

The invention provides a system for extracting information accessible by queries from merchant computer servers, such system comprising query servers, configured to run instances of a headless internet browser and configured to randomly generate a browser fingerprint identifier in requests from instances of the browsers, execute a driver module of a browser with timed keyboard input simulation commands, each request including a browser fingerprint identifier combining values for parameters selected from the group constituted by the name of a browser, the version of this browser, an operating system, the language of the browser, a type of device supposed to run the operating system, plug-ins available in the browser, and retrieve requests answers. The invention also provides a system for benchmarking information, comprising a module for extracting information and a module for comparing virtual references.

12 Claims, 1 Drawing Sheet

(56) References Cited

U.S. PATENT DOCUMENTS

| | | | | |
|---|---|---|---|---|
| 11,663,655 B2* | 5/2023 | Benkreira | ............... | G06Q 40/02 |
| | | | | 705/40 |
| 2003/0120615 A1* | 6/2003 | Kuo | ....................... | G06Q 20/12 |
| | | | | 705/78 |
| 2010/0312667 A1* | 12/2010 | Bishop | ................. | G06Q 20/382 |
| | | | | 705/26.41 |
| 2019/0325404 A1* | 10/2019 | Gupta | ................ | G06Q 20/0457 |

* cited by examiner

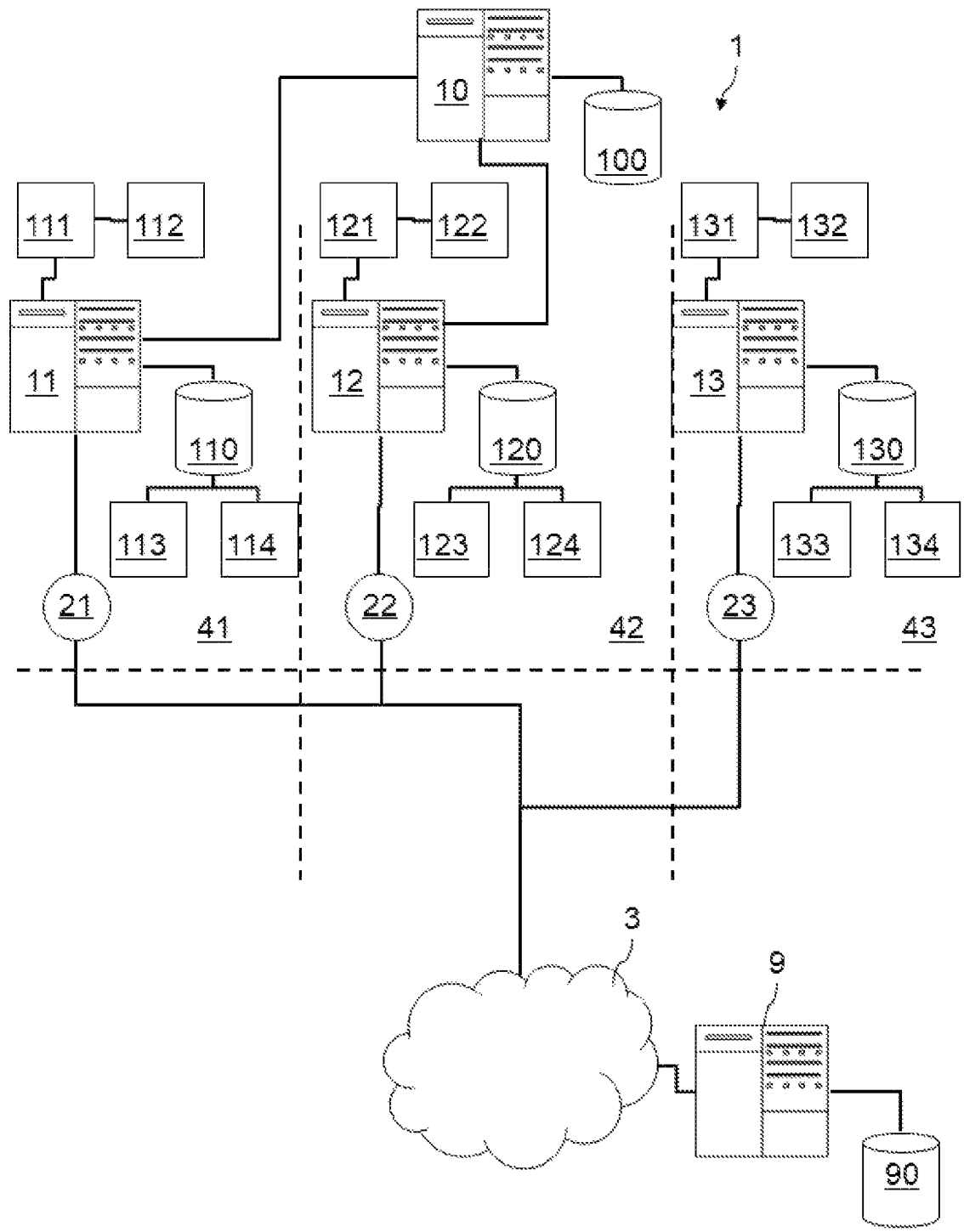

SYSTEM FOR EXTRACTING AND COMPARING INFORMATION ACCESSIBLE BY QUERIES FROM MERCHANT COMPUTER SERVERS

TECHNICAL FIELD

The present invention generally relates to online e-commerce, and more particularly relates to system for extracting and comparing information accessible by queries from merchant computer servers enabling organizations marketing products or services online to compare their prices with those of competitors displayed online.

BACKGROUND

Faced with the multiplicity and variety of products and services, it is particularly complicated to manage to obtain precise comparative monitoring between one's own products and services and those of competitors. Monitoring the prices of competitors' products and services by consulting and manually extracting the content of their website is tedious and provides inaccurate information.

As number of existing solutions deploy query servers to connect to computer servers of commercial sites, in order to extract the characteristics of the products and their prices, in order to be able to make a comparison with identical or similar products and services.

However, the said existing solutions are blocked by competitors or in order to preserve the resources or the bandwidth of their servers, certain commercial sites block the requests coming from indexing robots or interrogation robots, by identifying the multiplicity of these requests or the fact that these requests are sent en masse from data center IP addresses.

Therefore, there is need for a system which overcome aforesaid limitations and shortcoming of existing solution by avoiding blocking of their request and assist in extracting information on the characteristics and prices of products and services, without having to return to a manual method of extraction.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others.

Any discussion of the background art throughout the specification should in no way be considered as an admission that such background art is prior art nor that such background art is widely known or forms part of the common general knowledge in the field worldwide.

SUMMARY

A first aspect of the present invention relates to a system for extracting information accessible by requests from merchant computer servers. The system comprises a set of plurality query servers distributed in plurality of countries, each of the plurality of query servers is connected to the internet via a plurality of multiple proxy addresses, each server being further configured to run multiple instances of a headless web browser and being further configured to randomly generate a browser fingerprint identifier in requests from the instances of the headless browsers. At least one library of http requests accessible for the plurality of query servers, at least one database of merchant computer servers to be queried, each of said plurality of query servers being configured for sending an initial http request from the library to a merchant computer server selected in the at least one database, checking whether the initial http request is refused by said merchant computer server. If the initial http request has been refused by said merchant computer server, executing a driver module of a headless browser and executing an instance of the headless browser driven by the piloting, the driver module issuing commands for simulating timed input on the keyboard, issuing commands for simulating a movement of a computer mouse, and issuing commands for timing between successive actions of inputting on the keyboard and mouse movements of the headless browser, and so that the headless browser generates plurality of http requests intended for said selected merchant computer server and separated by time delays included in commands of the driver module, each request including a browser fingerprint identifier combining random values for multiple parameters randomly selected from the group consisting of the name of a internet browser, the version of this browser, an operating system, the language of the browser, a type of device supposed to run the operating system, plug-ins available in the browser. Further, retrieving the responses from said merchant computer server to said requests.

In accordance with an embodiment of the present invention, the driver module of the headless browser is configured to analyse the document object model of said merchant computer server and configured to generate said http requests with browser fingerprint identifiers dependent on analysis of the document object model.

In accordance with an embodiment of the present invention, the system further comprising a device for controlling said plurality of query servers.

In accordance with an embodiment of the present invention, the device is configured to retrieve and store responses from merchant computer server retrieved by said plurality query servers.

In accordance with an embodiment of the present invention, the responses from merchant computer server are stored in the form of virtual references in a database.

In accordance with an embodiment of the present invention, each virtual reference comprises from 1 to 100 distinct parameters (n varies 1 and 100).

A second aspect of the present invention relates to a system for benchmarking information accessible by requests from merchant computer servers, characterized in that it comprises a module for extracting information and creating virtual references retrieved from merchant computer servers and a module for comparing said virtual references.

BRIEF DESCRIPTION OF DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

At least one example of the invention will be described with reference to the accompanying drawings, in which:

FIG. 1 thus illustrates a schematic representation of an information extraction system 1 from merchant computer servers, according to an example of implementation of the invention, in accordance with an embodiment of the present invention.

It should be noted that the same numeral represents the same or similar elements throughout the drawings.

DESCRIPTION OF EMBODIMENTS

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain FIGURES, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e., meaning having the potential to), rather than the mandatory sense, (i.e., meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like are included in the specification solely for the purpose of providing a context for the present invention. It is not suggested or represented that any or all of these matters form part of the prior art base or were common general knowledge in the field relevant to the present invention.

The terms "query/queries" and "request/requests" are used herewith with the same meaning.

In this regard the invention below has been discussed with the help of drawings for clarity. However, a skilled addressee would appreciate that the invention is not limited to particular types of implementations that have been discussed below.

FIG. 1 thus illustrates a schematic representation of an information extraction system 1 from merchant computer servers, according to an example of implementation of the invention.

A first aspect of the present invention relates to an extraction system 1 intended to retrieve information accessible by requests from merchant computer servers.

The extraction system 1 comprises a set of several query servers 11, 12 and 13. The query servers 11 to 13 are here controlled by a control device 10 (for example implemented in the form of a computer server). The query servers 11 to 13 will be implemented to perform an extraction from a merchant computer server 9, connected to the internet network 3. The query servers 11, 12 and 13 are distributed in several different respective countries 41, 42 and 43. The plurality of query servers 11 to 13 and their location in different countries makes it possible not to appear to the merchant server 9 as a competing server concentrating requests with a view to sucking up product and service parameter data.

Each query server 11 to 13 is connected to the internet network 3 via multiple proxy addresses (e.g., residential, data center . . . etc). The reference 21 corresponds for example to a set of proxy servers connecting the query server 11 to the internet network 3. The reference 22 corresponds for example to a set of proxy servers connecting the query server 12 to the internet network 3. The reference 23 corresponds for example to a set of proxy servers connecting the query server 13 to the internet network 3. The addresses of proxy servers allow each of the query servers 11 to 13 not to appear with the merchant server 9 as a competing server intended to suck product and service parameter data from the merchant site 9.

Each query server 11 to 13 is configured to run a respective headless internet browser, here 111, 121 and 131 respectively. Each query server 11-13 is configured to randomly generate a browser fingerprint identifier in requests from the executed headless browser.

At least one library of initial http requests (and by extension https) is accessible for the query servers 11 to 13. This library of initial http requests can be stored in a database dedicated to each query server 11 to 13 (in the example illustrated, each query server 11 to 13 includes a respective database 114, 124, 134 storing a list of initial http requests). Provision can also be made for the query database to be stored in a database 100, controlled by the control device 10.

The extraction system 1 also comprises a database 100 of merchant computer servers to be interrogated. The database 100 is directly accessible by the piloting control device 1. The database 100 stores in particular the URL of the merchant computer server 9 whose parameters of the products and services must be analysed. The database 100 can associate the URL of each internet merchant server to be analysed with a library of initial http requests. It is also possible to envisage that each query server has its own copy of the library of initial http requests (for example the respective libraries 113, 123 and 133 for the query servers 11, 12 and 13).

Each query server 11, 12, 13 is configured to implement the following steps:
transmit an initial http request from the library, intended for the merchant computer server 9. The initial http requests can correspond to a query script from the merchant computer server 9. The merchant computer server 9 is previously selected in the database 100 as to be analysed;
check whether the initial http request is refused by said merchant computer server (9).

If the initial http request from a query server has been refused by the merchant computer server 9, this query server is configured to execute a module for driving a headless browser and to execute a headless browser driven by the piloting module. For example, the query server 11 has a driver module 112 and a headless browser 111, the query server 12 has a driver module 122 and a headless browser 121, and the query server 13 has a driver module 132 and a headless browser 131.

A headless browser is a web browser without a graphical interface. A headless browser usually makes it possible to automate the controls of a web page in an environment similar to certain common browsers, by command line control. A headless browser is usually particularly useful for testing web pages by correctly interpreting HTML, style sheets and running JavaScript with AJAX (acronym for Asynchronous JavaScript and XML in English); functions that are not always available during testing.

The control module of a headless navigator then emits:
commands for timed keyboard input simulations, to better correspond to the behavior of a human being and thus present less risk of being considered as an indexing robot;
commands for simulating a movement of a computer mouse, to correspond even more to the behavior of a human being and thus present less risk of being considered as a web crawler;
headless browser timeout commands, to include timeouts between successive keyboard input actions and headless browser mouse movements, and such that the headless browser generates multiple http requests to the merchant computer server selected and separated by time delays. Each http request generated includes a user browser fingerprint identifier combining random values for several parameters randomly selected from the group consisting of the name of an internet browser, the version of this browser, an operating system, the language of the browser, a type of device supposed to run the operating system, plug-ins available in the browser. Each query server 11, 12 or 13 has access to a respective database (114, 124 and 134 respectively) storing different values for each of these parameters.

A user agent is a client software application that uses a particular network protocol. When an internet user visits an internet server, his browser sends a string of characters to this server to identify the user agent. This character string is included in the HTTP request by the "User-Agent" header and provides information. The user agent is included in the browser fingerprint. The browser fingerprint includes information selected from the group including but not limited to: the name of the browser application, its version, the operating system in which the application is executed, the language, the type of device running the operating system, available plug-ins.

By generating http requests with random parameters in the browser fingerprint identifications, the requests submitted to the merchant server 9 are very dissimilar and have a very low probability of appearing as an attempt to index the data by a robot. Thus, a large number of requests can be submitted to the server 9 to obtain parameter values and prices for a large number of products and services. HTTP requests can be generated from a predefined list of products and services stored in a database.

So that the http requests submitted to the server 9 are consistent with reality, the browser fingerprint identifications are generated from a library of consistent parameter rules: for example to prevent a browser version parameter from being associated with an incompatible audio file plug-in version.

In order to optimize the http requests submitted, each headless browser driver module can be configured to analyse the document object model (for document object model in English) of the merchant computer server 9, and to generate the http requests with browser fingerprint identifiers optimized based on analysis of this document object model. For example, requests matching mobile phone browser fingerprint identifiers can be avoided.

Each query server 11 to 13 is configured to retrieve the responses from the merchant computer server 9 to the requests generated and submitted.

In some embodiments, the extraction system 1 further comprises a device 10 for controlling said plurality of query servers 11, 12, 13. Said device 10 may be configured to retrieve and store responses from merchant computer server 9 retrieved by said plurality query servers 11, 12, 13. Preferably, said device 10 is configured to retrieve and store responses from merchant computer server 9 retrieved by said plurality query servers 11, 12, 13.

The responses from merchant computer server 9 may preferably be stored in the form of virtual references—alternatively, transformed into virtual references and stored—in a database 110, 120, 130. Indeed, in a preferred embodiment of the present invention, the system for extracting information described herein create virtual references, which may thereafter be compared in order to benchmark products or services according to user requests.

Each virtual reference, which corresponds to a product or a service, is characterized in that it comprises several distinct parameters (n parameters), for example from 1 to 100 distinct parameters (n=1 to 100), from 1 to 80 (n=1 to 80), from 1 to 50 (n=1 to 50) or from 1 to 10 parameters (n=1 to 10). For example, if the virtual reference relates to a 3-night stay in an hotel, the virtual reference parameters may for example be the identification of the hotel, the type of home, the departure airport, the board, the number of nights and the occupancy of the room. According to this example, the virtual reference is characterized by 6 distinct parameters (n=6) and each parameter may be identified as $n_1$, $n_2$, $n_3$, $n_4$, $n_5$ and $n_6$.

A second aspect of the present invention relates to a system for benchmarking information relating to a product or a service available on the internet. The information is accessible by requests from merchant computer servers. The system for benchmarking information relating to a product or a service available on the internet is characterized in that it comprises a) a module for extracting information, as described above, such module further creating virtual references, and b) a module for comparing such virtual references, using association or matching algorithms. More precisely, after extraction, a virtual reference is created and stored for each product or service of interest, more precisely for each set of parameters determining the product or service of interest.

Virtual references from a first group of products or services are then compared to virtual references from a second group of products or services. As an example, virtual references from a merchant's catalogue are compared to virtual references from merchant's competitor's catalogues. Virtual references from a first group may also be compared to virtual references from a third group, a fourth group . . . etc. The comparison module is configured to compare distinct virtual references, more precisely the value of each parameter characterizing each virtual reference. More precisely, each parameter of virtual reference from the first group (e.g., merchant's catalogue) is first compared to the corresponding parameter of at least one virtual reference from the second group (e.g., first competitor's catalogue) until the virtual reference from the first group (e.g., merchant's virtual reference) matches a virtual reference from the second group (e.g., the first competitor's virtual reference). The term "match" hereby means "equal" or "correspond", as defined by the user according to a set of rules (defined below). For example, according to a first rule as defined by the user, a virtual reference from one group is said to match the virtual reference from a second group when the value of each of its parameters matches the parameters values of the second virtual reference. The user is typically the one to define the rules (identity, equivalence, function) for each parameter.

If the virtual references from the first group (e.g., merchant's virtual reference) does not match any of the virtual reference from the second group (e.g., the first competitor's virtual reference), the virtual reference from the first group (e.g., merchant's virtual reference) is compared to the virtual references from the third group (e.g., the second competitor's virtual reference), and so on. In other words, a virtual reference from the first group (e.g., merchant's catalogue) may be compared to several virtual references from a second group (e.g., first competitor's catalogue), a third group (e.g., second competitor's catalogue), a fourth group (e.g., third competitor's catalogue) until the virtual reference from the first group matches virtual reference(s) from the second group, third group, fourth group . . . etc.

If the virtual reference does not match any of the available other virtual references, this information is stored in the database and can be exploited as such by the user.

As explained above, each virtual reference typically comprises several distinct parameters (n parameters), for example from 1 to 100 distinct parameters, from 1 to 80, from 1 to 50 or from 1 to 10 parameters. For each comparison event, each parameter of each virtual reference from the first group is compared to each parameter of a virtual reference from a second group, third group, fourth group . . . etc. until the virtual references match.

The number of groups (e.g., competitor's catalogues) to be compared is not limited whatsoever. For example, the number of groups (m groups) (e.g., competitor's catalogues) may vary between 1 and 1,000 (m=1 to 1,000), for example, between 1 and 100 (m=1 to 100), between 1 and 50 (m=1 to 50), or between 1 and 20 (m=1 to 20).

In the absence of a system according to the invention, the comparison of products and services may be complex, inaccurate, or limited in scope. Indeed, once the data has been extracted, the comparison of products or services may become substantially complex due to the number of data to be analysed. Each product or service of interest may have several identical or similar products or services available on the internet to be compared to. The number of comparison events may be significantly high, for example up to several hundred million. The comparison may be especially complex when a large number of parameters determine the product or service (i.e., virtual reference). The system of the present invention therefore aims at solving these issues by providing a system which help companies accurately compare their products or services with those of their competitors in a meaningful way.

The system of the present invention makes possible to reproduce the comparison behavior of a human on a very large scale with the aim of obtaining information on its positioning (prices, stocks etc. . .)

In the system of the present invention, the virtual references representing a first group of products or services (e.g., merchant's products or services) are compared to virtual references representing a second group of products or services (e.g., those of merchant's competitors) based on defined rules. These rules are defined to compare the parameters of virtual references from one group of data to another group of data, for example from a merchant's catalogue to one or several merchant's competitor's catalogue(s).

If the conditions of the rule(s) are met, then the virtual references (i.e., products or services of interest) are associated and compared.

In some embodiments, the comparison algorithms (also called association or matching algorithms) are configured to use or apply 3 types or categories of rules:
 The parameters of the virtual references are strictly identical;
 The user has defined equivalences between his values and the values of his competitors for a given parameter; and
 The user has defined equivalent functions between its values and the values of his competitors for a given parameter.

In the context of a merchant involved with travel arrangements, the system of the present invention may for example compare an offer for a stay in a specific hotel for a determined duration to a stay in the same hotel for the exact same duration offered from one of the merchant's competitors. In this case, the values of the parameters of the virtual references to be compared (i.e., stay in the same hotel) are strictly identical (i.e., the exact same number of nights). The merchant may also define equivalences between the values of a defined parameter, thereby defining a second set of rules. For example, the parameters of the virtual references to be compared (i.e., stay in an hotel in a specify city) may have different values (i.e., a similar hotel in the same city), as defined by the user (e.g., the user may define that hotel A is equivalent to hotel B). Finally, the merchant may also define equivalent functions between the values of a defined parameter, thereby defining a third set of rules. For example, the parameters of the virtual references to be compared (i.e., flying from airport A to airport B on Monday and returning on Thursday, total duration 3 nights) may have different values (i.e., flying from same airport A to same airport B on Tuesday and returning on Friday, total duration 3 nights), as defined by the user (e.g., the user may define that flying on Tuesday is functionally equivalent to flying on Monday, and if not, then flying on Wednesday is functionally equivalent to flying on Monday, and so on . . . ).

Once the data is associated, the user may create reports demonstrating his positioning of the product or service of interest among several comparable products or services.

The combination of the module of extraction, including creation of virtual references, and the module of comparison, is advantageous as it allows to switch from a micro vision, according to which specific values are given to all the parameters, to a macro vision, according to which only certain values are given to the parameters, thereby permitting comparison to similar products or services.

The combined use of virtual references and matching rules in the system of the present invention allows the users to benefit from both a micro view and a macro view of their environment (notably defined by the requests and matching events).

As a detailed example, the system for benchmarking information described herein may for example allow to position the price for one night in a 3-star hotel in a specific location in August, by locking certain parameters of the service or product, for example the location, the star rating of the hotel and the month of stay. The result of such comparison may for example indicate whether the price for such product or service from one merchant's server is lower or higher than the price of the same product or service from another merchant's server and by how much (for example, 2.5% cheaper or 3.6% more expensive). Not only the system of the present invention allows to access such information, e.g., for such one night hotel, but also, if desired, a more detailed information, including for example details regarding the room setup and the number of occupants. Thanks to the combination of 3 rules categories described above, the system allows to search for comparable offers in a library of substantial comparable offers.

The system of the present invention offers the following technical advantages:
- Users can determine their competitors price listing on various platforms;
- Users can change price of their product or service by comparing their competitors cost of same product or service;
- Users can adapt their web marketing expenses depending on their market position; and
- Users may have activity reviews and negotiations with their suppliers based on very accurate information of their competitors offers.

In general, the word "module," as used herein, refers to logic embodied in hardware or firmware, or to a collection of software instructions, written in a programming language, such as, for example, Java, C, assembly, Python and NodeJS. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention

The invention claimed is:

1. System for extracting (1) information accessible by requests from merchant computer servers, characterized in that it comprises:
   a set of plurality of query servers (11, 12, 13) distributed in a plurality of countries, each of the plurality of query servers (11, 12, 13) is connected to the internet via a plurality of multiple proxy addresses (21, 22, 23), each server being further configured to run multiple instances of a headless web browser (111) and being further configured to randomly generate a browser fingerprint identifier in requests from the instances of the headless browsers;
   at least one library (113) of http requests accessible for the plurality of query servers (11, 12, 13);
   at least one database (100) of merchant computer servers to be queried;
   each of said plurality of query servers (11, 12, 13) being configured to:
      send an initial http request from the library to a merchant computer server (9) selected in the at least one database (100);
      check whether the initial http request is refused by said merchant computer server (9);
      if the initial http request has been refused by said merchant computer server (9), execute a driver module (112) of a headless browser (111) and execute an instance of the headless browser (111) driven by a piloting, the driver module (112) issuing commands for simulating timed input on the keyboard, issuing commands for simulating a movement of a computer mouse, and issuing commands for timing between successive actions of inputting on the keyboard and mouse movements of the headless browser (111), and so that the headless browser (111) generates plurality of http requests intended for said selected merchant computer server (9) and separated by time delays included in commands of the driver module (112), each request including a browser fingerprint identifier combining random values for multiple parameters randomly selected from a group (114) consisting of the name of a internet browser, the version of this browser, an operating system, the language of the browser, a type of device supposed to run the operating system, plug-ins available in the browser; and
      retrieve the responses from said merchant computer server (9) to said requests.

2. The system (1) of claim 1, wherein the driver module (112) of the headless browser (111) is configured to analyse a document object model of said merchant computer server (9) and configured to generate said http requests with browser fingerprint identifiers dependent on analysis of the document object model.

3. The system (1) of claim 1, further comprising a device (10) for controlling said plurality of query servers (11, 12, 13).

4. The system (1) of claim 3, wherein said device (10) is configured to retrieve and store responses from merchant computer server (9) retrieved by said plurality query servers (11, 12, 13).

5. The system (1) of claim 1, wherein the responses from merchant computer server (9) are transformed into virtual references and stored in a database (110, 120, 130).

6. The system (1) of claim 1, wherein the responses from merchant computer server (9) are stored in the form of virtual references in a database (110, 120, 130).

7. The system (1) of claim 6, wherein each virtual reference comprises from 1 to 100 distinct parameters.

8. A system for benchmarking information accessible by requests from merchant computer servers, characterized in that it comprises a module for extracting information and creating virtual references retrieved from merchant computer servers (9) and a module for comparing said virtual references, wherein each virtual reference comprises from 1 to 100 distinct parameters, wherein the module for extracting information is characterized in that it comprises:
   a set of plurality of query servers (11, 12, 13) distributed in a plurality of countries, each of the plurality of query servers (11, 12, 13) is connected to the internet via a plurality of multiple proxy addresses (21, 22, 23), each server being further configured to run multiple instances of a headless web browser (111) and being further configured to randomly generate a browser fingerprint identifier in requests from the instances of the headless browsers;

at least one library (113) of http requests accessible for the plurality of query servers (11, 12, 13);

at least one database (100) of merchant computer servers to be queried;

each of said plurality of query servers (11, 12, 13) being configured to:

send an initial http request from the library to a merchant computer server (9) selected in the at least one database (100);

check whether the initial http request is refused by said merchant computer server (9);

if the initial http request has been refused by said merchant computer server (9), execute a driver module (112) of a headless browser (111) and execute an instance of the headless browser (111) driven by a piloting, the driver module (112) issuing commands for simulating timed input on the keyboard, issuing commands for simulating a movement of a computer mouse, and issuing commands for timing between successive actions of inputting on the keyboard and mouse movements of the headless browser (111), and so that the headless browser (111) generates plurality of http requests intended for said selected merchant computer server (9) and separated by time delays included in commands of the driver module (112), each request including a browser fingerprint identifier combining random values for multiple parameters randomly selected from a group (114) consisting of the name of a internet browser, the version of this browser, an operating system, the language of the browser, a type of device supposed to run the operating system, plug-ins available in the browser; and retrieve the responses from said merchant computer server (9) to said requests.

9. The system of claim 8, wherein the module for comparing references is configured to compare virtual references from a first group of products or services to virtual references from a second group of products or services.

10. The system of claim 8, wherein said module for comparing references comprises at least one comparison algorithm.

11. The system of claim 8, wherein said module for comparing references comprises several comparison algorithms.

12. The system of claim 11, wherein the comparison algorithms are configured to apply at least three types of rules according to which:

Parameters of the virtual references are strictly identical;

A user has defined equivalences between the values of his virtual reference's parameters and the values of his competitors' virtual references parameters; and A user has defined equivalent functions between the values of his virtual reference's parameters and the values of his competitors' virtual references parameters.

* * * * *